July 31, 1934.  S. N. NICKLISS  1,968,159
SAFETY LEVER
Filed March 28, 1934  3 Sheets-Sheet 1
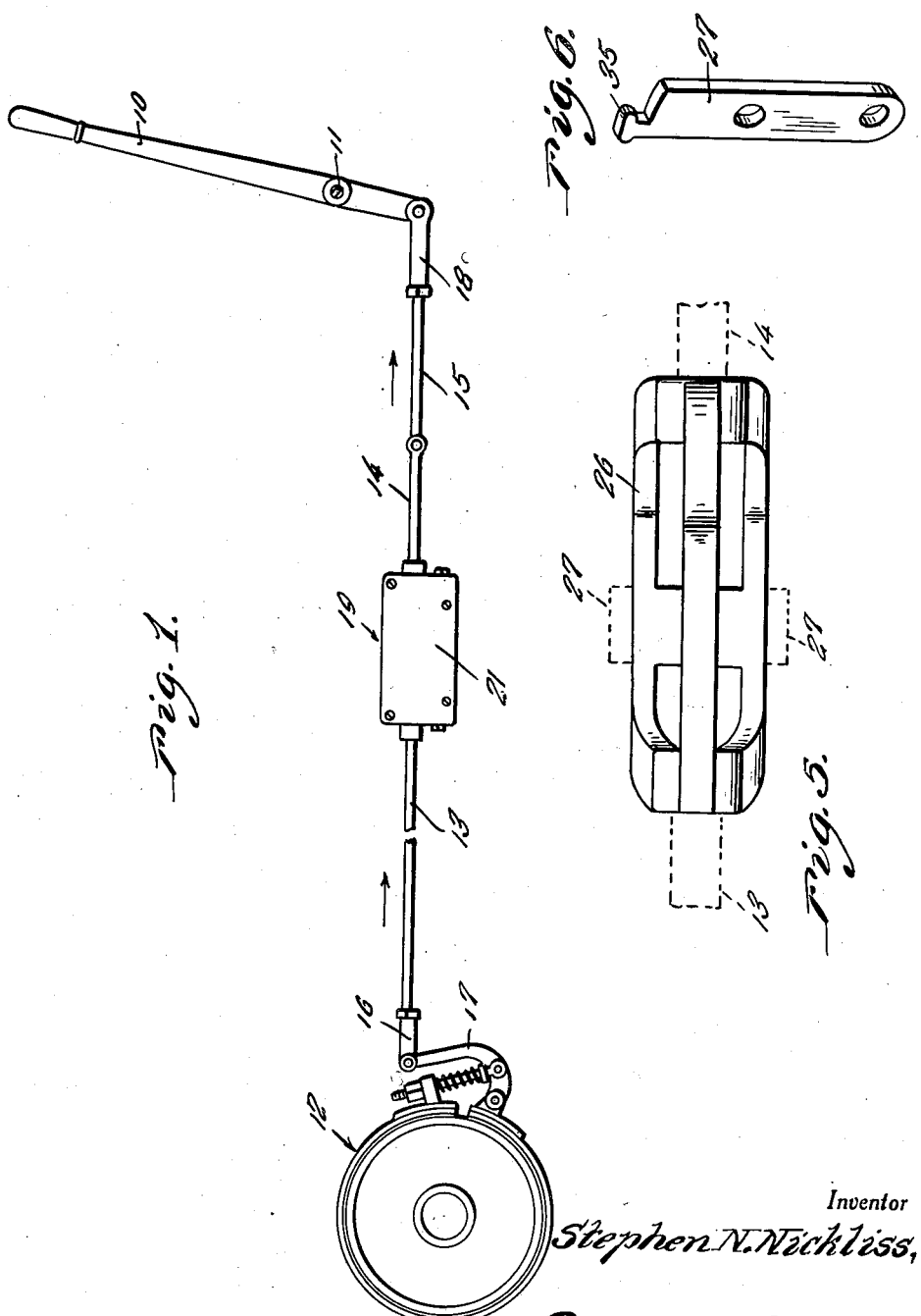
Inventor
Stephen N. Nickliss,
By Clarence A. O'Brien
Attorney July 31, 1934.　　　　S. N. NICKLISS　　　　1,968,159
SAFETY LEVER
Filed March 28, 1934　　　3 Sheets-Sheet 2
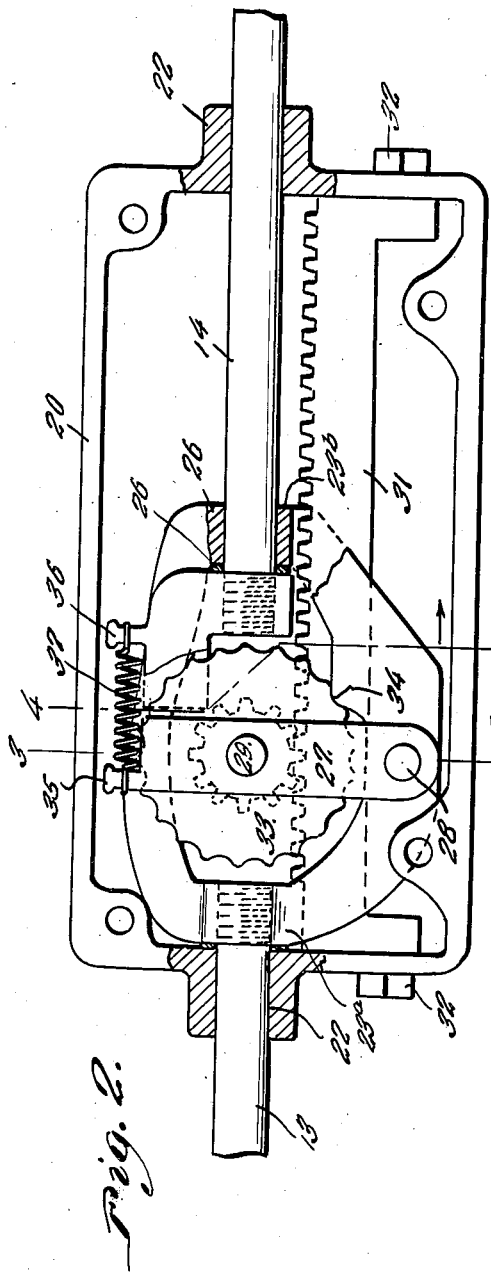
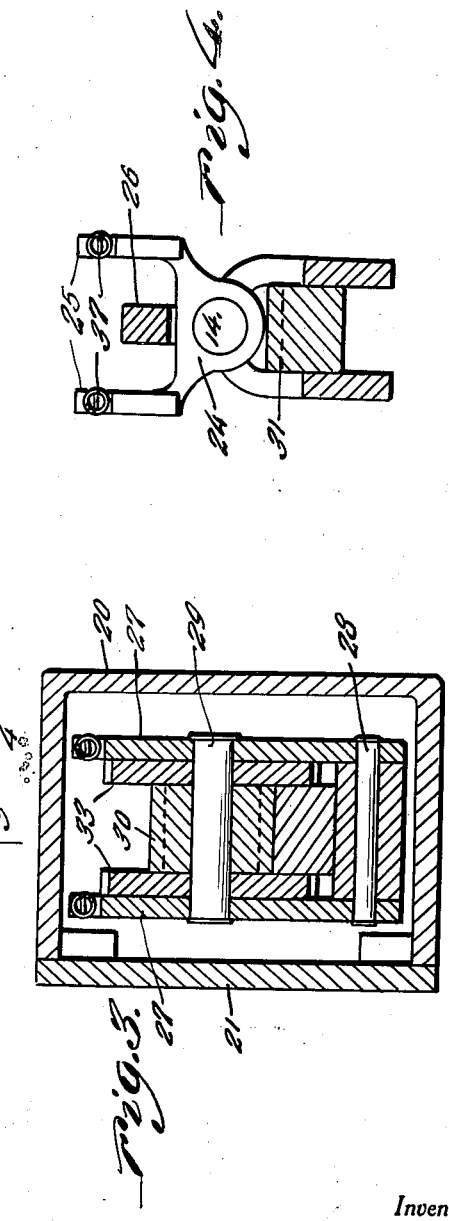
Inventor
Stephen N. Nickliss,
By Clarence A. O'Brien
Attorney

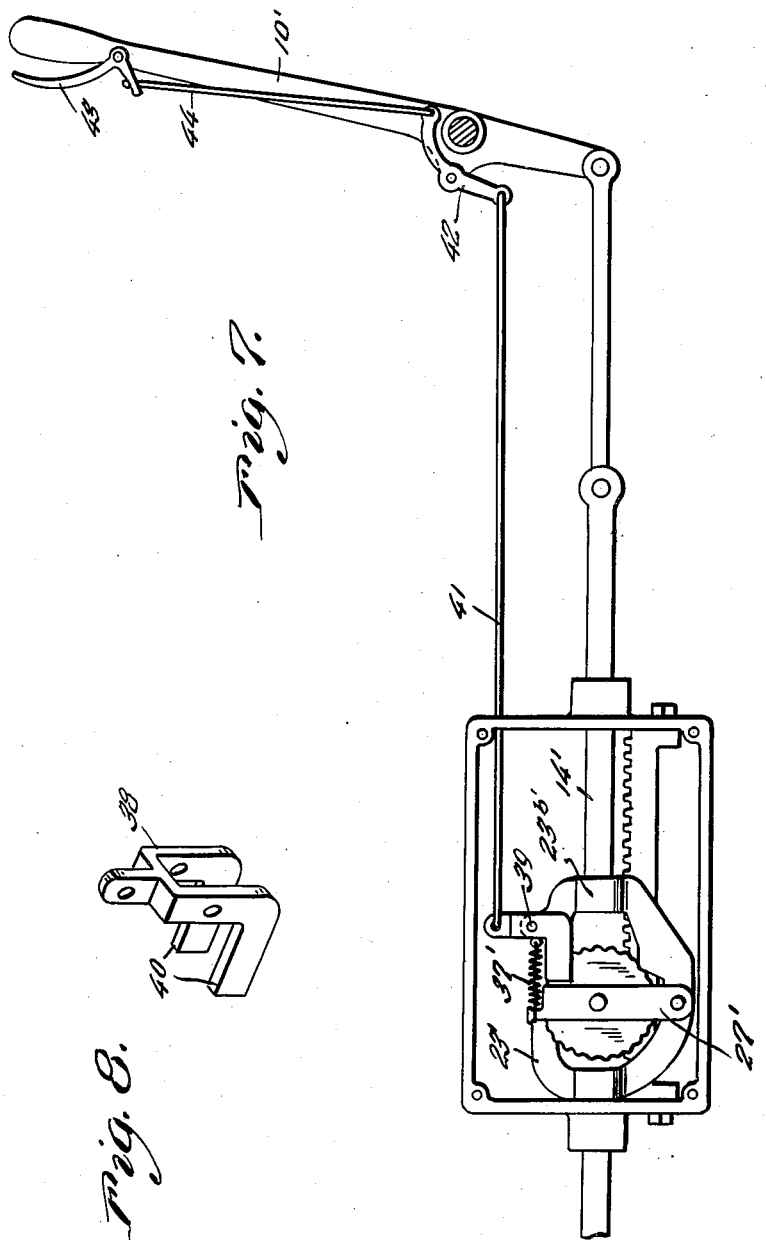

Patented July 31, 1934

1,968,159

UNITED STATES PATENT OFFICE 1,968,159

SAFETY LEVER

Stephen N. Nickliss, Laureldale, Pa.

Application March 28, 1934, Serial No. 717,866

7 Claims. (Cl. 74—530)

The invention has reference to hand levers and more particularly to the provision of improved and efficient means for securing the lever at the desired adjustment against accidental displacement.

It is a prime object of the present invention to provide a hand lever and means for securing the same in adjusted position that while not necessarily limited to, is particularly adapted for use as an emergency brake lever for automobiles.

In connection with the above it may be further stated that an important object of this invention is to dispense with the usual segment and detent as now provided for securing the hand lever at the desired adjustment and to substitute therefor a mechanism which is more efficient and positive in operation.

The invention together with its objects and advantages will be best understood from a study of the following description taken in connection with the accompanying drawings wherein:

Figure 1 is a view somewhat diagrammatically illustrating the application of the invention.

Figure 2 is an enlarged view with certain parts removed and other parts broken away and shown in section for more clearly illustrating the invention.

Figures 3 and 4 are sectional views taken substantially on the lines 3—3 and 4—4 respectively of Figure 2.

Figure 5 is a top plan view of what may be termed a buckle member.

Figure 6 is perspective view of an arm hereinafter more fully referred to.

Figure 7 is an elevational view of a slightly modified form of the invention, and Figure 8 is a perspective view of an abutment element.

Referring to the drawings by reference numerals it will be seen that 10 indicates generally a hand lever pivotally mounted as at 11 and adapted for use in applying, as for example, a vehicular wheel brake 12 as clearly suggested in Figure 1. As shown the lever 10 is operatively connected with the brake 12 through the medium of rod sections 13 and 14 respectively, link 15, a suitable coupling 16 between the rod section 13 and the link 17 of the brake, and a coupling 18 between the link 15 and the lower end of the lever 10; together with my improved device indicated generally by the reference numeral 19 serving to operatively connect the rod sections 13 and 14.

The device 19 constituting the salient features of the present invention comprises a casing 20 that may be suitably and conveniently mounted on some fixed part of the automobile, and this casing 20 is provided with a suitable cover plate 21. At the end thereof the casing 20 is suitably formed as at 22 to accommodate the ends of the rod sections 13, 14 that extend into the casing 20.

The inner ends of the rod sections 13, 14 are coupled together through the medium of a buckle 23. The buckle 23 is of substantially frame structure of the cross section best shown in Figures 3 and 4.

In the form of the invention shown in Figures 1 to 6 inclusive the buckle 23 has one end 23a thereof threaded on to the inner end of the rod section 13, while the opposite end 23b is provided with an aperture for slidably accommodating an end of the rod section 14, all of which will be clear from a study of Figure 2. The last named end of the rod section 14 is limited in its movement relative to the buckle 23 in one direction through the medium of a body or nut 24 threaded on said end of the rod section 14 and provided with abutment arms 25 disposed at opposite sides of the buckle as suggested in Figure 4 and provided for a purpose hereinafter made manifest. Between the nut 24 and the adjacent end 23b of the buckle 23 there is disposed a suitable washer 26.

Carried by the buckle 23, and disposed at opposite sides thereof are arms 27 and these arms are pivoted at one end through the medium of a pivot pin 28 as will be clear from a study of Figures 2 and 3. The arms 27 support therebetween a short shaft 29, and rotatably mounted on the shaft 29 is a pinion wheel 30 that is in constant mesh with the rack bar 31 that extends longitudinally through the buckle 23 and is secured at its opposite ends to the end walls of the casing 20 in a manner indicated generally at 32.

Disposed at opposite sides of the pinion 30 and integral therewith are locking disks 33. The disks 33 have their peripheral edges corrugated or otherwise formed to provide a series of alternating humps and hollows cooperable with shoulders 34 provided on opposite sides of the buckle 23 in a manner and for a purpose hereinafter made more manifest.

The arms 27 are in alinement with the abutments 25 and the arms 27 and abutments 25 respectively are provided with headed studs 35 and 36 respectively to accommodate the ends of short connecting springs 37. Manifestly springs 37 normally act on the arms 27 to cause the same to rotate in a clockwise direction for yieldably retaining the corrugated peripheries of the locking disks 33 engaged with the shoulders 34. Normally the ends of the abutment 25 are slightly spaced from the arms 27 as shown in Figure 2.

The utility and operation of the device will, it is believed, be apparent from the following:

The parts are shown in the drawings as occupying a released position. On applying the brake 12 the lever 10 is pulled toward the operator to rotate about its pivot 11 in a counter clockwise direction. This will of course result, first in a pull on the rods 13, 14 and associated parts in the direction of the arrows shown in Figure 1 for effecting an application of the brake 12. In this connection it will be understood that the yoke 23 will be caused to move in a corresponding direction pinion 30 and disks 33 being free to rotate in a clockwise direction to permit the necessary movement of the buckle 23. However, as soon as the lever 10 is released the brake 12 through the medium of its spring and associated parts will exert a pull on the rod 13 consequently resulting in a pull on the buckle 23 and this will have a tendency to cause the arms 27 (in Figure 2) to rotate in an anti-clockwise direction. Accordingly the peripheries of the disks 33 will be urged into engagement with the shoulders 34 fitting in the hollows in the peripheries of the disks in a manner to effectively lock the parts, and especially the lever 10 in fixed adjusted position against casual displacement. With this device therefore it will be apparent that a jar occasioned, as for example, by a second automobile bumping into the parked automobile equipped with this invention, will have little effect toward releasing the parts due to the effective locking of the parts in adjusted position in a manner clear from the above. To release the brake 12 the lever 10 will of course be rotated in a reverse direction to the position shown in Figure 1. This movement of the lever 10 will cause the rod 14 to move toward the left in Figure 2 relative to the buckle 23. As a result of this movement of the rod 14 relative to the buckle 23 abutment arms 25 will move into abutting engagement with the arms 27, causing said arms to rotate in a counter clockwise direction a distance sufficient to move the disks 33 away from the shoulders 34 so that the peripheries of the disks will clear said shoulders. Continued movement of the rod 14 with the abutment arms 25 engaging the arms 27 will serve to maintain the peripheries of the disks 33 clear of the shoulders 34 until such time as the lever 10 assumes the released position; when the lever is then released by the operator. Upon release of the lever 10 the rod 14 will remain stationary permitting the buckle 23 under the pull exerted by the released brake 12 to move relative to the rod 14 toward the nut 24 and until the end 23b of the buckle comes into abutment with the nut 24, at which time the parts then assume the normal released position shown in Figure 2.

It will be further apparent from the above that this invention will permit of a rather minute adjustment of the lever 10 so that the proper tension may be obtained for applying the brake 12.

In the form shown in Figures 7 and 8 the principle is substantially the same and the result substantially as efficient as obtained with the first described form of the invention. The second form of the invention merely illustrates the manner in which a detent may be employed. Thus it will be seen that in this second form of the invention the end of rod section 14' instead of being slidably associated with the buckle 23' is rigidly connected therewith as by being screw threadedly engaged with the end 23b' of the buckle. Further, in this form of the invention the abutment is in the form of an inverted U-shaped member 38 pivoted as at 39 to a lug suitably provided on the upper portion of the buckle 23'. The abutment 38 is provided with the abutment arms 40 that aline with the arms 27', the springs 37' in this form of the invention being suitably anchored at one end to the buckle 23' in proximity to the pivot 39 provided for the abutment 38. The abutment 38 is operatively connected through the medium of a link 41 with one end of a bell crank 42 pivotally mounted on the lever 10'. The lever 10' in the present instance is provided with a detent including the usual finger lever 43 and link 44 connecting the lever 43 with the bell crank 42.

In order to release the brake where this form of the invention is employed the operator presses the lever 43 toward the lever 10' for rocking the bell crank 42 and thus exerting a pull 41 on the link. This in turn causes the member 38 to rotate in a clockwise direction with the result that through the medium of the springs 37, arms 27' will be moved into engagement with the abutments 40. The rotation of the member 38, and the engagement of the abutments 40 with the arms 27' will cause the latter to rotate in a counter clockwise direction to release, that is to say to move the peripheries of the disks 33 out of engagement with the shoulder of the buckle 23'. The lever 10' is then pulled toward the operator in a manner to apply the brakes as thought to be clear from the above detailed description of the first form of the invention.

Having thus described my invention, what I claim as new is:

1. A device of the character described comprising a lever, a pair of aligned rod sections, an operating connection between one of the rod sections and said lever, an operating connection between a second one of said rod sections and a device to be controlled by said lever, a buckle connecting the rod sections, a fixed rack bar, arms pivoted on the buckle, a rack wheel, rotatable on an axis supported by said arms, having constant mesh with said rack bar, discs rotatable with said rack wheel about said axis, and provided with corrugated peripheries, shoulders on the buckle, elastic devices engaged with said arms tending to yieldably retain the peripheries of said discs engaged with said shoulders to thereby secure the lever in adjusted position, abutments arranged in the paths of said arms and engageable therewith to swing the arms in opposition to the elastic devices to release said discs and means for moving the abutments in motion transmitting engagement with said arms incidental to a shifting of said lever to thereby release said discs and permit free adjustment of said lever.

2. A device of the character described comprising a lever, a pair of aligned rod sections, an operating connection between one of the rod sections and said lever, an operating connection between a second one of said rod sections and a device to be controlled by said lever, a buckle connecting the rod sections, a fixed rack bar, arms pivoted on the buckle, a rack wheel, rotatable on an axis supported by said arms, having constant mesh with said rack bar, discs rotatable with said rack wheel about said axis, and provided with corrugated peripheries, shoulders on the buckle, said buckle and the first named rod section being loosely connected together for movement relative to one another, abutments carried by said one rod section, elastic devices connecting said arm and said abutment and tending to yieldably retain the peripheries of said disk engaged with said shoulders to thereby secure the lever in adjusted position, said abutments being movable with said one rod section upon a shifting of the lever to engage said arm and thereby rotate the latter in opposition to said elastic devices to release said disks and to hold the same in released position during movement of said lever.

3. A device of the character described comprising a lever, a pair of aligned rod sections, an operating connection between one of the rod sections and said lever, an operating connection between a second one of said rod sections and a device to be controlled by said lever, a buckle connecting the rod sections, a fixed rack bar, arms pivoted on the buckle, a rack wheel, rotatable on an axis supported by said arms, having constant mesh with said rack bar, discs rotatable with said rack wheel about said axis, and provided with corrugated peripheries, shoulders on the buckle, abutments pivotally mounted on the buckle and adapted to be swung into engagement with the arms for rotating the same in one direction to move the peripheries of the disk out of engagement with shoulders, spring devices engaged with said arms tending to yieldably retain the peripheries of the disks engaged with said shoulders, the relative arrangement of said arms, shoulders and abutments being such that the abutments are normally out of engagement with the arms when the peripheries of the disks are engaged with said shoulders, and manual means mounted on the lever and operatively connected with the abutment for swinging the latter to engage them with the arms for releasing said disks to thereby permit free adjustment of said lever.

4. A device of the character described comprising a lever, a pair of aligned rod sections, an operating connection between one of the rod sections and said lever, an operating connection between a second one of said rod sections and a device to be controlled by said lever, a buckle connecting the rod sections, a fixed rack bar, arms pivoted on the buckle, a rack wheel, rotatable on an axis supported by said arms, having constant mesh with said rack bar, discs rotatable with said rack wheel about said axis, and provided with corrugated peripheries, shoulders on the buckle, elastic devices engaged with said arms tending to yieldably retain the peripheries of said discs engaged with said shoulders to thereby secure the lever in adjusted position, and means controllable by the operator of said lever for engaging said arms to rotate the latter in opposition to said elastic devices to thereby release said discs and permit free adjustment of said lever.

5. The herein described control mechanism comprising a fixed rack bar, a member movable longitudinally of the rack bar, a rack wheel in constant mesh with the rack bar, means supporting and retaining the rack wheel in operative position to the rack bar and pivoted on said member, a control member, an operating connection between said control member and said shiftable member, releasable means normally retaining the rack wheel against rotation to thereby secure the shiftable member in set position, and remote control means for releasing the rack wheel to thereby permit free movement of the shiftable member and thereby permit adjustment of the control member.

6. In a device of the character described a pair of alined rod sections, a buckle connecting said rod sections and having fixed engagement with one of said sections and engagement with the other of said sections for relative movement of said buckle and the second named section, a fixed rack bar, a rack wheel carried by the buckle, a fixed rack bar with which said rack wheel is in constant engagement, inter-engaging means on the buckle and the rack wheel normally retaining the rack wheel against rotation to thereby lock the buckle in set position, and means for releasing the rack wheel incidental to a movement of the second rod section relative to the buckle to thereby permit a shifting of the buckle.

7. In a device of the character described, a fixed rack bar, a pair of rod sections, a buckle rigidly connecting said rod sections and movable longitudinally of the rack bar, a rack wheel rotatably mounted on the buckle and in constant mesh with the rack bar, inter-engaging means on the rack wheel and the buckle for releasably retaining the rack wheel against rotation to thereby lock the buckle in set position, and means for releasing the rack wheel to permit free sliding movement of the buckle.

STEPHEN N. NICKLISS.